12) United States Patent
Honda et al.

(10) Patent No.: US 6,829,219 B1
(45) Date of Patent: Dec. 7, 2004

(54) ROUTING PROCESSING METHOD IN PACKET TRANSMISSION AND SYSTEM THEREFOR

(75) Inventors: Masahiko Honda, Tokyo (JP); Takafumi Sera, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/534,125

(22) Filed: Mar. 23, 2000

(30) Foreign Application Priority Data

Mar. 29, 1999 (JP) .......................................... 11-086683

(51) Int. Cl.⁷ .............................................. H04L 12/26
(52) U.S. Cl. ...................................................... 370/230
(58) Field of Search ................................ 370/230, 235, 370/389, 392, 400, 401; 709/232, 238, 224

(56) References Cited

U.S. PATENT DOCUMENTS 5,920,705 A * 7/1999 Lyon et al. ............... 395/200.7
6,182,146 B1 * 1/2001 Graham-Cumming, Jr. . 709/238

FOREIGN PATENT DOCUMENTS

| JP | 1-135154 | 5/1989 |
| JP | 1-225261 | 9/1989 |
| JP | 4-157844 | 5/1992 |
| JP | 4-183044 | 6/1992 |
| JP | 4-306031 | 10/1992 |
| JP | 5-327719 | 12/1993 |
| JP | 6-244867 | 9/1994 |
| JP | 9-200265 | 7/1997 |
| JP | 4-282935 | 10/1999 |

* cited by examiner

Primary Examiner—Melvin Marcelo
(74) Attorney, Agent, or Firm—Foley & Lardner LLP

(57) ABSTRACT

A routing processing system in a packet transmission is capable of restricting a delay in a routing process based on particular applications being utilized. The packet transmission routing processing system performs a routing process for an input packet and includes parsing and timer processing for identifying an application corresponding to an intended transmission of an input packet and monitoring a timer value provided for the application. Routing and transferring processes determine a transmission destination port on the basis of a destination address stored in a routing table, and dispose of the packet or transfer packet to a preliminary determined route depending on the identified application when routing process exceeds the timer 19 Claims, 6 Drawing Sheets

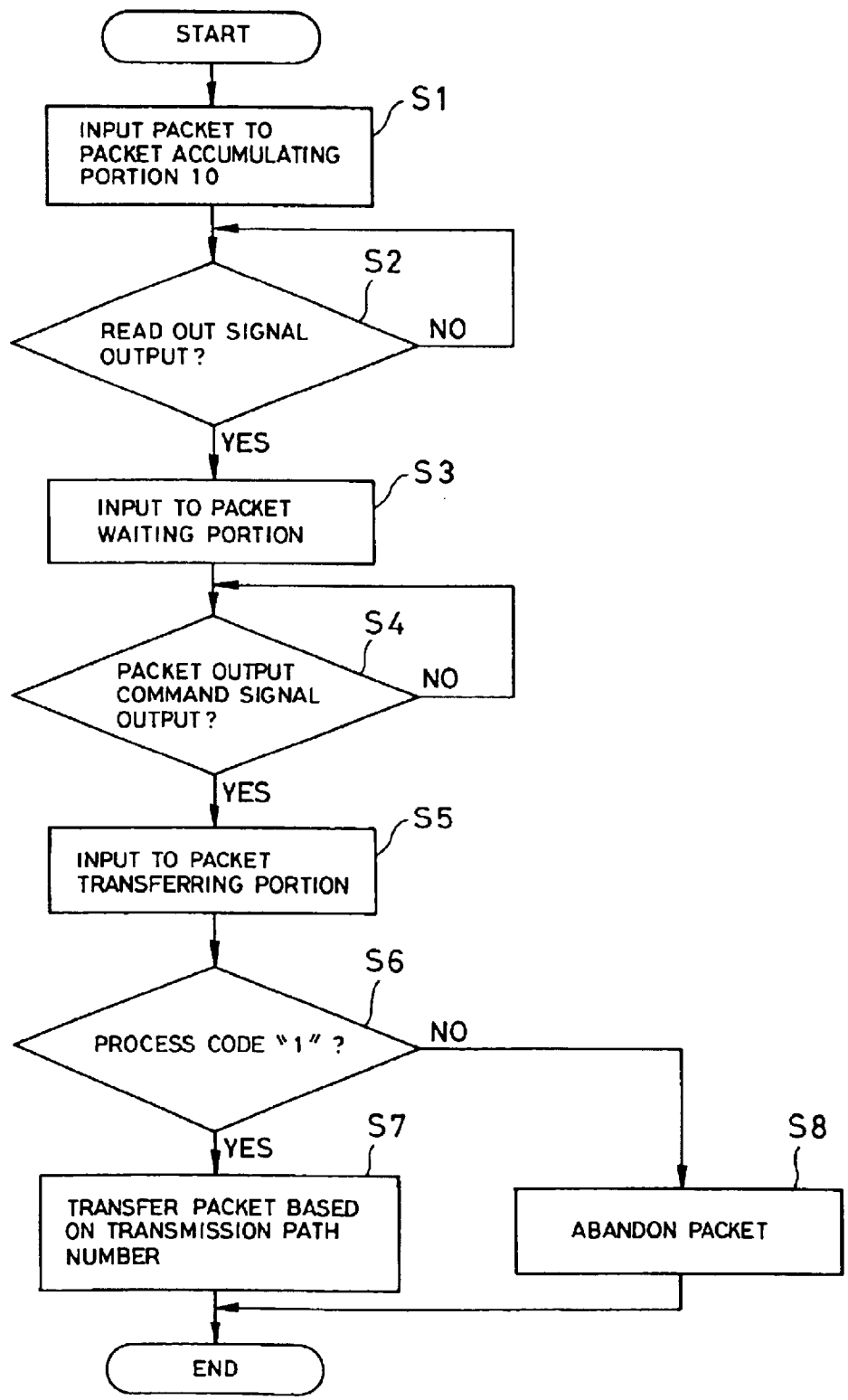

ROUTING PROCESSING METHOD IN PACKET TRANSMISSION AND SYSTEM THEREFOR

BACKGROUND OF THE INVENTION

1. Field of the Invention

The present invention relates generally to a routing processing method in a packet transmission and a system therefore. More particularly, the invention relates to a routing processing method in a packet transmission and a system therefore, for performing delay control of a packet in an internet telephone communication in a Transmission Control Protocol/Internet Protocol (TCP/IP) network.

2. Description of the Related Art

Conventionally, a router disposed in the CP/IP network of this type (such as intranet, internet, extranet, hereinafter only referred to internet) retrieves a routing table from a destination address to read out a data transmission path to a transmission destination for transmitting a packet to the read out transmission path. In this case, packet transmission cannot be carried out until completion of routing retrieval. Therefore, a transmission period of the packet is significantly variable depending upon a retrieval period of the routing table.

In the recent internet performing packet transmission, a best effort type service is typical. The best effort type service is a service to do the best effort for accomplishing a processing considering the entire network but does not guarantee end-to-end service. Therefore, in the worst case, service cannot be provided. The recent internet is apt to exceed traffic in the existing wired and radio telephone services. As a result, even in the internet which has provided the best effort type service conventionally, a service quality (Qos: quality of service) comparable with the conventional type communication network is require to be realized.

In such TCP/IP communication network, guarantee for delay of packet transmission is becoming important. Particularly, in the case of transmission telephonic speech (talk signal) in a form of a packet, clarity of telephonic conversation can be degraded to make delay unacceptable if end-to-end delay becomes in excess of about 100 msec. Accordingly, it becomes necessary to restrict the delay of packet transmission in the TCP/IP communication network to be a predetermined value or less. In such TCP/IP communication network, one of the important causer of packet transmission delay is the routing process in the router. Accordingly, when a processing amount in the routing process in the router is large (upon a high load condition) and when the routing process cannot be performed at high speed, it becomes impossible to restrict the delay to be less than or equal to the predetermined value.

Various proposals have been made for the routing process of this kind. For example, in Japanese Unexamined Patent Publication No. Heisei 4-183044, for "Routing Control System with Modification of Transmission Source Data", correction of a user data of a transmitted PUD (Protocol Unit Data) can be corrected only by transmitting a user data modification PUD within a transmission holding period when correction becomes necessary after transmission of PUD containing the large amount user data by a transmission source end system or when the correction amount is small.

On the other hand, in Japanese Unexamined Patent Publication No. Heisei 6-244867, for "Back-up Route Connection Stand-by Routing System", connection of a backup path is conditioned upon the occurrence of a failure in a junction line. In this method, real-time routing depending upon the condition of the back-up path is enabled, and in conjunction therewith, traffic and node load in the network can be reduced. Furthermore, by restricting increase of the number of junction stages, the possibility of abandonment or dropping of packets can be reduced. In addition, by preventing the back-up path from unnecessarily opening, the communication period can be reduced to reduce wasting of communication cost.

As set forth above, in the prior art, delay in packet transmission due to the routing process in the router is caused in the communication network. If the amount of routing process in the router is large for high load and thus the routing process cannot be executed at high speed, it becomes impossible to restrict the delay for internet telephone communication to be less than or equal to the allowable predetermined value.

SUMMARY OF THE INVENTION

The present invention has been worked out in view of the problem in the prior art as set forth above. It is therefore an object of the present invention to provide a routing process in a packet transmission and a system therefor, which does not effect abandonment of packet for an application not given importance for a delay value to restrict delay in the routing process adapting to the application for enabling reduction of process period required for routing process.

In order to accomplish the above-mentioned object, according to the first aspect of the present invention, a routing processing method in a packet transmission for an input packet as an object for routing, comprises the steps of:

performing a process for identifying an application adapting for transmission of an input packet;

performing a process for setting a timer value preliminary provided for the identified application:

performing a process for routing to determine a port of transmission destination on the basis of a destination address stored in a routing table; and performing a process for abandoning a packet or transferring the packet to a predetermined route adapting the identified application when routing process cannot be completed exceeding the set timer value.

According to the second aspect of the present invention, a packet transmission routing processing system performing a routing process for an input packet as a routing object, comprises:

parsing and timer processing means for identifying an application corresponding to transmission of an input packet and monitoring a timer value preliminary provided for the application; and routing and transferring means for determining a port of a transmission destination on the basis of a destination address stored in a routing table and disposing the packet or transferring the packet to a preliminary determined route adapting to the identified application when routing process is continued beyond the timer value monitored by the parsing and timer processing means.

In the preferred construction, the parsing and timer processing means and the routing and transferring processing means may comprise:

a packet accumulating portion accumulating the input packet;

a packet parsing portion performing parsing for identifying the application corresponding to the packet from the packet accumulating portion and reading out of a destination address;

a packet waiting portion waiting the packet from the packet parsing portion and transmitting the packet in response to a packet output command;

packet transferring portion for transferring the packet output from the packet waiting portion to a packet output port on the basis of a transmission destination designation and next process designation;

a timer value determining portion outputting a timer value and a next process code corresponding to the application identified by the packet parsing portion;

a monitoring timer portion outputting a time out signal upon termination of measurement of the timer value from the timer value determining portion; and a routing retrieving portion outputting a packet output designation signal to the packet waiting portion and outputting a transfer path number and a process code to the packet transferring portion when the routing process based on the destination address from the timer value parsing portion or a time out signal is input from the monitoring timer portion.

The timer value may be a timer for executing a predetermined process when routing retrieval is not completed within a period designated by the timer value, and the next processing code may be a code designating the process of packet to be object for the routing process when retrieving process in the routing retrieving portion is not completed within the period designated by the timer value.

The predetermined process in the timer value may be to terminate the routing process irrespective of normal or abnormal of the result of process within the period designated by the routing retrieval period of the timer value, and the process of the packet in the next process code may be abandonment of the packet or transferring to a predetermined path when the transmission destination cannot be determined.

In the monitoring timer portion, a counter may be employed, the counter outputs a time out signal generated by measuring the timer value from the timer value determining portion to the routing retrieving portion.

The timer value determining portion may comprise:

an application judgment portion for generating an address at a value the same as an application identification number from the packet parsing portion or a value derived by multiplying or dividing the application identification number by an integer; and a random access memory reading out the preliminary stored timer value and the next process code for outputting to the monitoring timer and the routing retrieving portion corresponding to the address from the application judgment portion.

The timer value determining portion comprises:

a content-addressable memory storing the application identification number, the timer value and the next process code in combination, the content-addressable memory outputs the timer value and the next process code stored therein on the basis of the input application identification number. The random access memory or the content accessable memory may be a detachable and rewritable storage element. The packet transmission may further include input operation and storage processing means for rewriting the timer value in the random access memory or the content addressable memory. In the alternative, the packet transmission routing processing system may further include an external storage data modifying device connected to the random access memory or the content-addressable memory for rewriting the timer value. In the further alternative, the packet transmission routing processing system may further include an external storage data modifying and communicating device receiving a designation data from a communication network for modifying the timer value of the random access memory or content-addressable memory.

The routing retrieving portion may comprise a processing unit including a microprocessor or a digital signal processor executing a sequence for outputting a packet output command signal to the packet waiting signal, and outputting a transfer path number and the process code to the packet transferring portion when the routing process based on the destination address from the packet paring portion is completed or after input of the time out signal from the monitoring timer.

The application identified by the parsing and timer processing means may be at least an internet telephone protocol in a TCP/IP communication network. The timer value may be a period for obtaining clarity of telephone conversation in a TCP/IP communication network. The period to obtain clarity in the telephone conversation may be in a range of 10 msec. to 50 msec.

As set forth above, the routing processing method in the packet transmission and the system therefor sets the preliminary provided timer value for the application identified by the input packet to determine the port of the transmission destination on the basis of the destination address stored in the routing table. In this case, when the routing process cannot be completed even after elapsing of the set timer value, the packet is abandoned or transferred to the predetermined route depending upon the identified application.

As a result, it becomes possible to restrict the period required for routing process in the packet transfer to be the predetermined value or less. In this case, for the application which does not give importance for the delay value, the packet is not abandoned. As such, delay in the routing process is restricted per application.

Accordingly, for the application, for which small delay is required and abandonment ratio of packet to less important, the timer value is set at small value to restrict the relay value at smaller value. As a result, the process period required for routing process can be reduced.

For example, in the internet telephone, for voice transmission in real-time, preferred end-to-end delay period is less than or equal to 100 msec. If delay becomes longer than the preferred delay period, satisfactory clarity of telephonic conversation cannot be obtained and such delay is unacceptable. It has been established that, in case of telephone voice, the end-to-end delay less than or equal to 100 msec. is established rough standard. In case of the Internet telephone, it is possible that call connection is established through several hops of the routers. A delay per hop is 50 msec. or less in case of two hops, and 20 msec. or less in case of five hops. Accordingly, it becomes meaningless to transfer the packet for which a delay in excess of 100 msec. is caused. Therefore, such packet is abandoned. Namely, by setting the timer value of routing process of the packet of the internet telephone to be about 10 msec. to 50 msec. in which satisfactory clarity of telephone conversation can be obtained, for example, packet requiring process period in excess of the set period can be abandoned.

On the other hand, the packet transmission routing processing system according to the present invention rewrites the timer value corresponding to the delay value employing the detachable and rewritable storage element, input operation and storage processing means external storage data modifying device or the external storage data modifying and communicating device.

As a result, it becomes possible to set the timer value adapting to each application. Particularly, adapting to modification of the transmission standard of the TCP/IP communication network or establishing condition, modification of the period to obtain satisfactory clarity in telephonic conversation is facilitated. On the other hand, freedom of the device construction (design) can be improved.

BRIEF DESCRIPTION OF THE DRAWINGS

The present invention will be understood more fully from the detailed description given hereinafter with reference to the accompanying drawings of the preferred embodiment of the present invention, which, however, should not be taken to be limitative to the present invention, but are for explanation and understanding only.

In the drawings:

FIG. 5 is a flowchart showing a process procedure in a routing processing operation of a packet in the shown embodiment;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
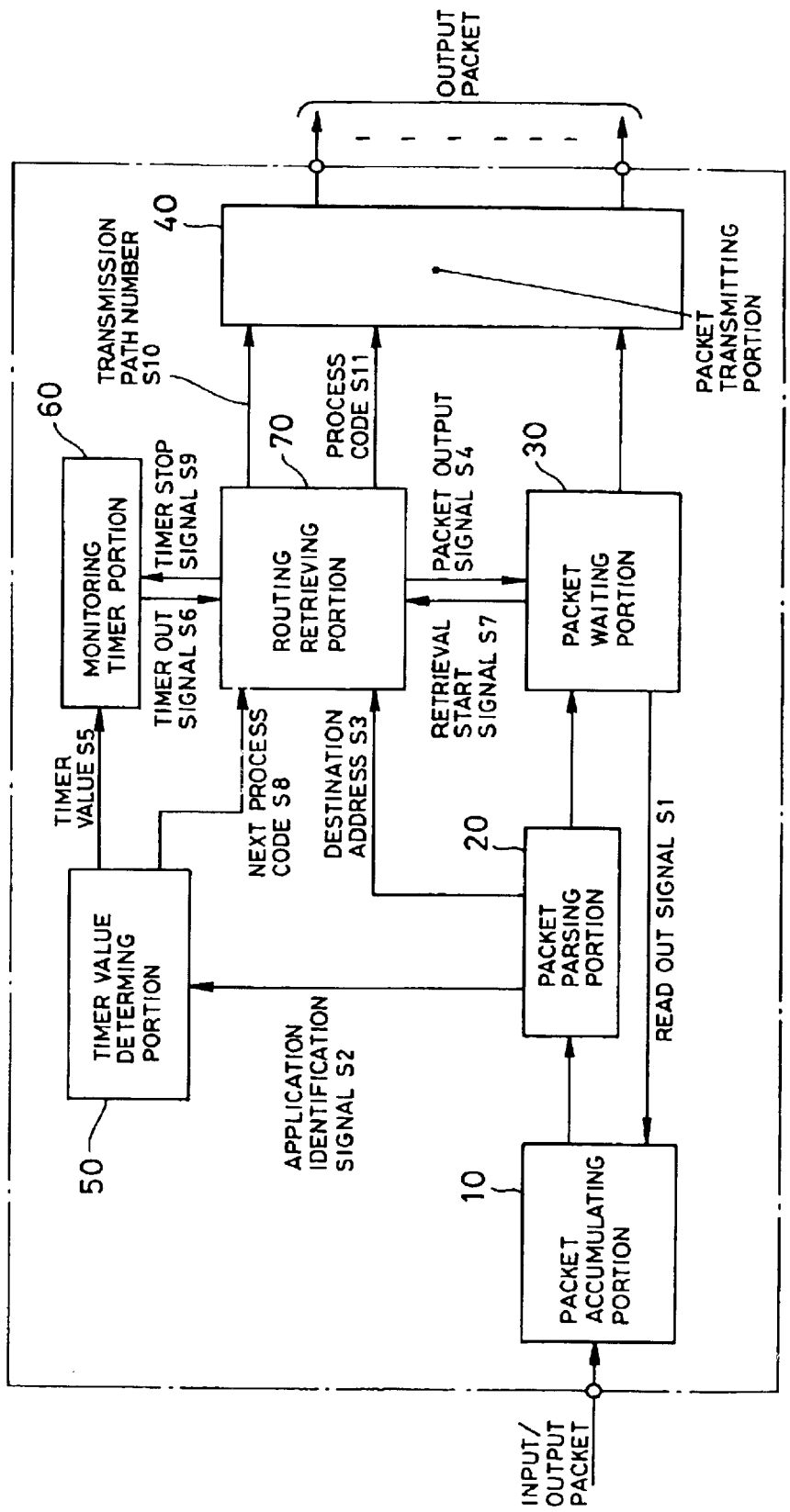
FIG. 1 is a block diagram showing a construction of an embodiment of a routing processing method in a packet transmission and a system therefor, according to the present invention.

FIG. 1 is a block diagram showing a construction in an embodiment of a routing processing method in a packet transmission and a system therefor according to the present invention.

In FIG. 1, a routing processing system is arranged in an FDDI local area network (LAN) included In a TCP/IP communication network for routing process with other Ethernet LAN or communication network, for example.

The routing processing system includes a packet accumulating portion 10 for accumulating one or more input packets, a packet parsing portion 20 transmitting a signal identifying an application (application identification signal S2) corresponding to a packet read out from the packet accumulating portion 10 on the basis of a read signal S1 to a timer value determining portion 50 and performing parsing of the application for reading out a destination address S3.

On the other hand, the routing processing system has a packet waiting portion 30 for waiting a packet from the packet parsing portion 10 and outputting one packet to a packet transmitting portion 40 after inputting of a packet output designating signal S4 from a routing retrieving portion 70, the packet transmitting portion 40 outputting the packet output from the packet waiting portion 30 on the basis of a transmission destination designating signal and a next process designating signal (packet output designating signal S4) from the routing retrieving portion 70, to a packet output terminal corresponding to a predetermined path, and a timer value determining portion 50 outputting a preliminary provided (written) timer value S5 to a monitoring timer portion 60 and outputting a next process code S8 which will be discussed later, to the routing retrieving portion 70, corresponding to the application identified by the packet parting portion 20 (the application identification signal S2 output therefrom).

Furthermore, the routing processing system further includes the monitoring timer portion 60 having a timer value table and outputting a time out signal S6 to a routing retrieving portion 70 upon completion of time measurement of the preliminary stored timer value S5, and the routing retrieving portion 70. The routing retrieving portion 70 outputs the packet output designating signal S4, and outputs a transmission path number S10 and the process code S11 to the packet transmission portion 40 when the routing process is completed on the basis of the destination address S3 output by the packet parsing portion 20 or after inputting of the time out signal S6 output by the monitoring timer portion 60.

Next, operation of the shown embodiment will be discussed.

At first, discussion will be given for operations in respective portions.

Figure 2:
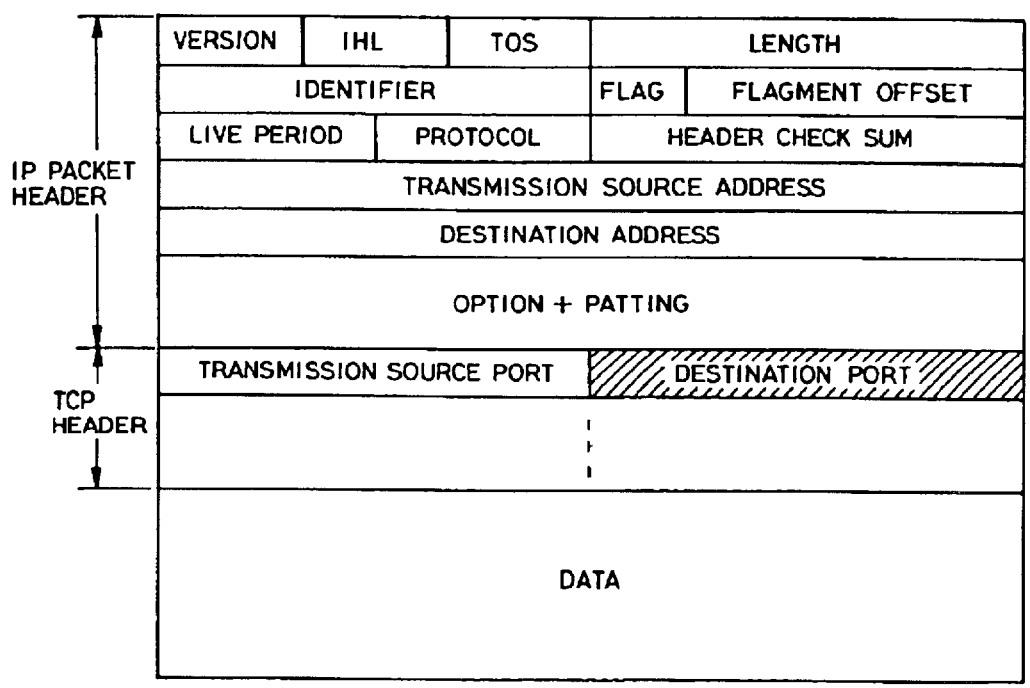
FIG. 2 is an illustration showing a content of format of an IP packet in the shown embodiment.

FIG. 2 is an illustration showing an example of content of a format of an IP packet.

In FIG. 1, the packet accumulating portion 10 sequentially accumulates input packets from a packet transmission path. The packet accumulating portion 10 accumulates one or more packets therein, and feeds one packet to the packet parsing portion 20 when the packet waiting portion 30 outputs the read out signal Si.

In FIGS. 1 and 2, the packet parsing portion 20 reads out a content of a header of the IP packet. From the format, judgment is made what application will use the packet. For example, a number in a destination port A in FIG. 2 stored in a TCP header, is one data for making judgment what is the protocol higher than or equal to a layer 4 in the packet transmission, normally. With this data, the application is identified.

As the application to be the object for Identification, an Internet telephone protocol (such as NetMeeting, InternetPhone, CU-SeeMe, Net2Phone, CoolTalk, FPPhone, HTTP, RealAudio), Telnet (service/program for remote login to a computer of the TCP/IP communication network), FTP (File Transfer Protocol: file transfer protocol In the TCP/IP communication network) have been known.

It should be noted that TOS (Type of Service) in FIG. 2 is a parameter (minimum delay, maximum throughput, maximum reliability, minimum cost) for a route determining matrix of the routing process (routing protocol/OSPF: Open Shortest-Path First Interior Gateway Protocol).

In the shown embodiment, the destination port number is used as the application identification number as is. The application identification number obtained set forth above (application identification signal S2) Is output to the timer value determining portion 50. Furthermore, the packet parsing portion 20 reads out the destination address from the header of the packet to output the destination address S3 to the routing retrieving portion 70. Furthermore, the packet is transferred to the packet waiting portion 30.

In FIG. 1, the packet waiting portion 30 is responsive to inputting of the packet output by the packet parsing portion 20, to stop transmission of the read out signal S1 output to the packet accumulating portion 10, and to output a retrieval start signal S7 to the routing retrieving portion 70. Then, when the packet output command signal S4 from the routing retrieving portion 70 is input, the packet waiting portion 30 outputs the accumulated packet to the packet transmission portion 40.

In FIGS. 1 and 2, a timer value determining portion 50 determines the timer value S5 and the next process code S8 on the basis of the application identification number when the application identification signal S2 indicative of the identification number of the application format content of the IP packet shown in FIG. 2 which is output by the packet parsing portion 20. The timer value S5 is fed to the monitoring timer portion 60 and the next process code S8 is fed to the routing retrieving portion 70. For example, in the internet telephone communication, an end-to-end delay period has to be less than or equal to 100 msec. If a delay longer than this is caused, telephonic conversation becomes unacceptable for lack of clarity. Accordingly, if delay in excess of 100 msec is caused, it becomes meaningless to transmit the packet. Thus, packet is abandoned.

It should be noted that the end-to-end delay period is preferably within a range of 10 msec to 50 msec in view of various materials and actually measured values.

Figure 3:
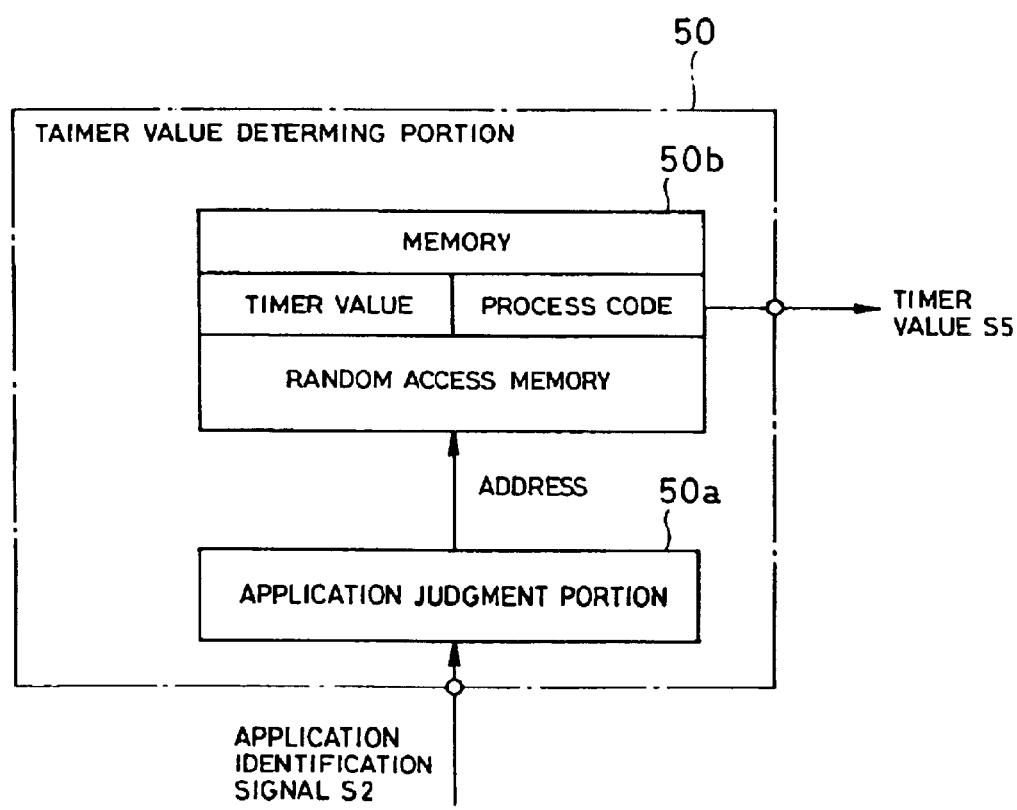
FIG. 3 to a block diagram showing an example of an internal construction of a timer value determining portion shown in FIG. 1.

FIG. 3 is a block diagram showing an example of an internal construction of the timer value determining portion 50.

The timer value determining portion 50 shown in FIG. 3 has an application judgment portion 50a and a random access memory 50b.

In the timer value determining portion 50, the application identification signal S2 indicative of the identification number of the application from the packet parting portion 20 is input to the application judgment portion 50a. In the application judgment portion 50a, an address which is the same as the application identification number or a value derived by multiplying or dividing the application identification number by an integer is generated. The address is input to the random access memory 50b. Data stored in the address is read out as the timer value S5 and the next process code S8 to output to the monitoring timer portion 60 and the routing retrieving portion 70. It should be noted that a predetermined value is written in the random access memory 50b.

Figure 4:
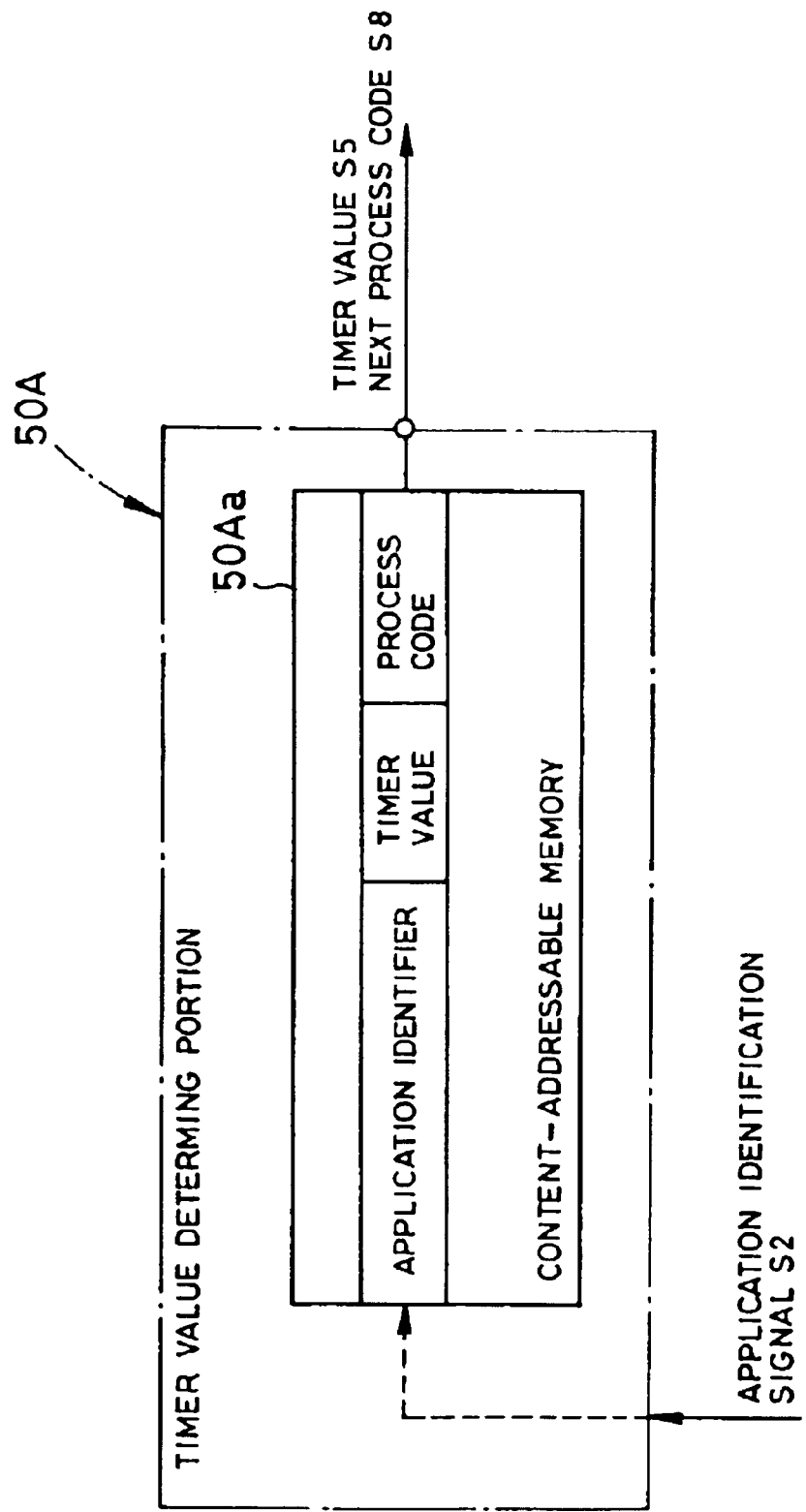
FIG. 4 Is a block diagram showing another example of an internal construction of a timer value determining portion shown in FIG. 1.

FIG. 4 is a block diagram showing another example of the internal construction of the timer value determining portion 50 in FIG. 1.

The timer value determining portion 50A shown in FIG. 4 has a content-addressable memory 50Aa storing the application identification number S2, the timer value S5 and the next process code S8 in combination and outputs the timer value S5 and the next process code S8 on the basis of the input application identification number. It should be noted that a predetermined value is written in the content-addressable memory 50Aa.

The timer value S5 and the next process code S8 are determined by the timer value determining portion 50 (50A).

The timer value S5 is a value defined for performing a particular abnormal process when the routing retrieval cannot be completed within the period designated by the value. Namely, a process is always terminated within the period designated by the routing retrieval period (timer value S5) irrespective whether the result of the process is normal or abnormal.

When the retrieval process in the routing retrieving portion 70 cannot be completed within the period designated by the timer value S5, it designates how the packet to be the object for the routing process is to be processed. In the shown embodiment, the process is defined as follow. When the value of the next process code S8 is "0", the packet is abandoned. When the value of the next process code S8 Is "1", the packet is fed to the default path. The default path is a predetermined path to transfer the packet when it cannot be determined where the packet is to be transferred.

When the timer value S5 output by the timer value determining portion 50 is input, the monitoring timer portion 60 outputs the time out signal S6 to the routing retrieving portion 70 when the period determined by the timer value S5 is measured. On the other hand, when a timer stop signal from the routing retrieving portion 70 is not input, the monitoring timer portion 60 does not output the time out signal S6 until the timer value S5 is input from the timer value determining portion 50.

The monitoring timer portion 60 can be realized using the counter. In this construction, the timer value S5 is stored in the counter to decrement the count value by one per expiration of the given period. When the count value becomes 0, the time out signal S6 is output.

Next, if the destination address S3 is input from the packet parsing portion 20, or when both of the destination address S3 and the next process code S8 from the timer value determining portion 50 are input, the routing retrieving portion 70 initiates an output path determining process. In connection with information for routing retrieval, a routing table is normally established by a routing protocol or so forth, each an entry corresponding to the best matching with the destination address S3 is selected among the routing table to determine the output path. As a structure and retrieving method of the routing table concerning the determining process of the output path, a known structure and method may be used.

In the routing retrieving portion 70, when the time out signal S6 is input from the monitoring timer portion 60 during the determining process of the output path, a number preliminary determined as a vacant number or a number designating the default path is output as the transfer path number S6. The next process code S8 received from the timer value determining portion 50 as the process code Sil in advance, is output to the packet transferring portion 40.

Furthermore, in the routing retrieving portion 70, when the output path determination process is completed before inputting of the time out signal S6 from the monitoring timer portion 60, the timer stop signal S9 is output to the monitoring timer portion 60.

Next, on the basis of the transfer path number S10 and the process code Sell from the routing retrieving portion 70, the packet transfer portion 40 abandons packet received from the packet waiting portion 30 or feeds to the packet output line. The transfer path number S10 represents any one of a plurality of packet outputs in the packet transferring portion 40. Here, when the process code S11 is "0", the packet is abandoned. On the other hand, when the process code S11 is "1", the packet is fed to the packet output line indicated by the transfer path number S10.

Next, discussion will be given for the major part in the routing processing operation.

FIG. 5 is a flowchart showing a processing procedure in the routing processing operation of the packet.

In FIGS. 1 and 5, the packet input to the packet accumulating portion 10 through the packet input line is accumulated in the packet accumulating portion 10 until the read out signal S1 is input from the packet waiting portion 30 (sep S1). When the read out signal S1 is output to the packet accumulating portion 10 from the packet waiting portion 30 (step S2: Yes), the packet accumulated in the packet accumulating portion 10 is output to the packet parsing portion 20.

The header content of the packet input to the packet parsing portion 20 is read out, the application identification signal S2 identifying the internet telephone protocol, Telnet, FTP or so forth is transmitted to the timer value determining portion 50, or the destination address S3 is transmitted to the routing retrieving portion 70. Furthermore, the packet is fed to the packet waiting portion 30 (step S3).

When the packet is input to the packet waiting portion 30, the retrieval start signal S7 is output to the routing retrieving portion 70. The packet in the packet waiting portion is held (waited) by the packet waiting portion 30 until the packet output command signal S4 is output from the routing retrieving portion 70. Once the packet output command signal S4 is input from the routing retrieving portion 70, the packet waiting portion 30 transfer the packet to the packet transfer portion 40 (steps S4 and S5).

The packet transfer portion 40 operates to abandons the packet or to select any one of a plurality of packet output lines on the basis of the transfer path number SIO and the process code Sib from the routing retrieving portion 70 (steps S6,S1S8). The process code is to determine whether the packet is to be abandoned or transferred, the transfer path number Sb is to determine which packet output lines is to be selected upon transferring the packet.

FIGS. 6A to 6D are block diagrams showing constructions of major parts of other embodiments.

Figure 6A:
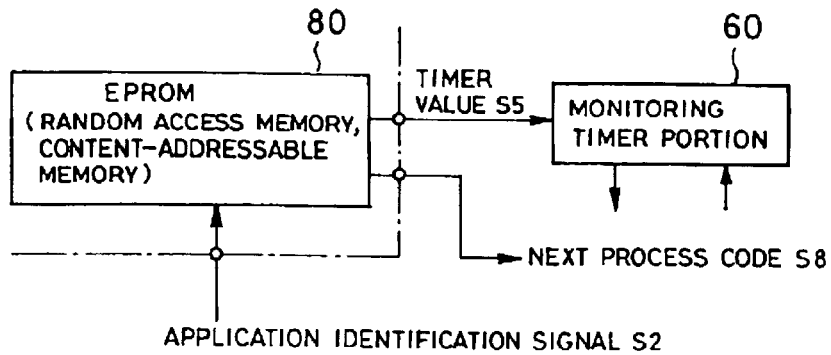
FIGS. 6A to 6D are block diagrams showing construction of the major part of another embodiment.

FIG. 6A is an embodiment, in which EEPROM 80 which is detachable and rewritable of the timer value S5, as the random access memory 50b of the timer value determining portion 50 shown in FIG. 3 and the content-addressable memory 50Aa shown in FIG. 4.

Figure 6B:
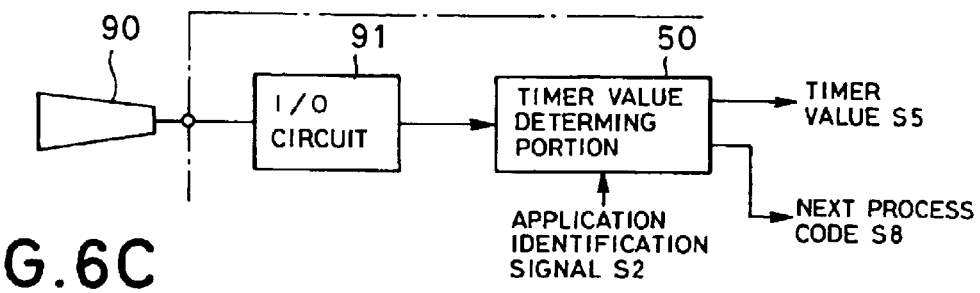

On the other hand, FIG. 6B shows an embodiment, in which a flash memory is employed as the random access memory 50b of the timer value determining portion 50 shown in FIG. 3 or the content-addressable memory 50Aa shown in FIG. 4, and an input/output (I/O) circuit 91 is provided together with an operating device (keyboard) 90 as an input operation and storage processing means.

Figure 6C:
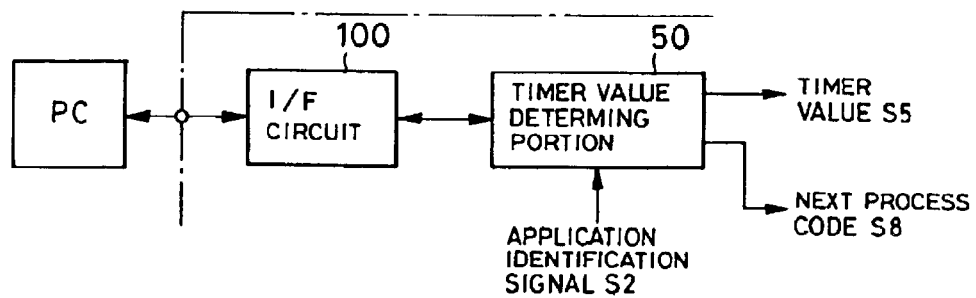

FIG. 6C shows an embodiment, in which a flash memory is employed as the random access memory 50b of the timer value determining portion 50 shown in FIG. 3 or the content-addressable memory 50Aa shown in FIG. 4, and an interface (I/F) circuit 100 is provided for connection with a compact general purpose computer (maintenance terminal) PC as an external storage data modifying device. Though this compact general purpose computer, the timer value S5 is re-written.

Figure 6D:
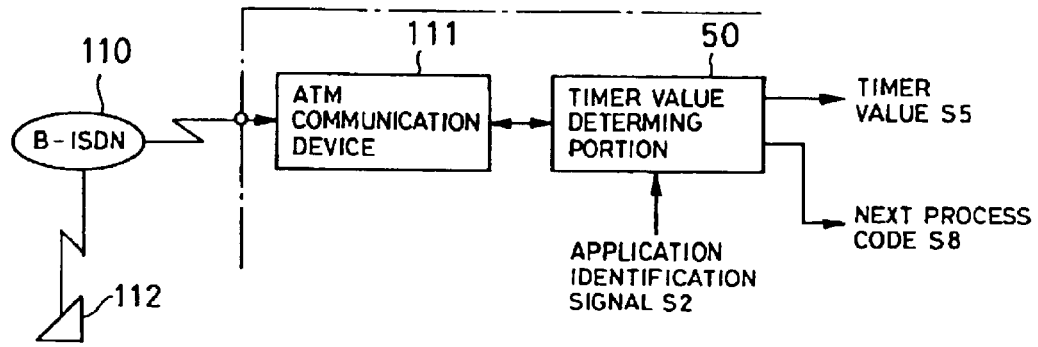

On the other hand, FIG. 6D shows an embodiment, in which a flash memory is employed as the random access memory 50b of the timer value determining portion 50 shown in FIG. 3 or the content-addressable memory 50Aa shown in FIG. 4, and an ATM transmission device 111 as an external storage data modifying and communicating device for rewriting the timer value S5 from an ATM communication (such as a wide band (B) ISDN) 110. The ATM transmission device receives the rewriting designating packet from a host unit or an ATM communication terminal 112 to perform rewriting of the timer value S5. It should be noted that other communication network may be employed in place of the ATM communication network.

With the construction illustrated in FIGS. 6A to 6C, setting of the timer value adapting to respective application becomes possible to facilitate modification the allowable period for achieving satisfactory clarity of telephonic conversation upon modification transmission standard of the TCP/IP communication network, or use condition (network establishing condition) in a service provider. Also, sufficient freedom in designing associated with variation of the standard of the TCP/IP communication network can be obtained.

As can be clear from the foregoing discussion, with the routing processing method in the packet transmission and the system therefor in accordance with the present invention, when the routing process is not terminated even after exceeding of the preliminary set timer value for the application identified by the input packet, the packet is abandoned adapting to the identified application or the packet is transferred to the preliminary determined route.

Accordingly, for the application requiring small delay and abandonment rate of the packet is less important, the time value is set at a small value to restrict the delay amount to a small value. As a result, process period required for routing process can be reduced.

As a result, the timer value can be set adapting to each application. In particular, concerning a modification of the transmission standard of the TCP/IP communication network or establishing condition, the period to obtain clarity of telephonic conversation can be modified easily. Furthermore, a freedom in designing the system construction can be enhanced.

With the packet transmission routing process system according to the present invention, the timer value corresponding to the delay value is re-written by means of detachable or rewritable storage element, the input operation and storage processing means, the external storage data modifying device or the external storage data modifying and communicating device.

As a result, the timer value can be set adapting to each application. In particular, concerning a modification of the transmission standard of the TCP/IP communication network or establishing condition, the period to obtain clarity of telephonic conversation can be modified easily. Furthermore, a freedom in designing the system construction can be enhanced.

Although the present invention has been illustrated and described with respect to exemplary embodiments thereof, it should be understood by those skilled in the art that the foregoing and various changes, emission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A routing processing method in a packet transmission for an input packet as an object for routing, comprising the steps of:
performing a process for identifying an application for transmission of said input packet;
performing a process for setting a timer value provided for the identified application;
performing a process for routing the input packet to determine a transmission destination port on the basis of a destination address stored in a routing table; and
performing a process of abandoning the input packet or transferring the input packet to a predetermined route when the routing process exceeds the set timer value.

2. A packet transmission routing processing system performing a routing process for an input packet, comprising:
parsing and timer processing means for identifying an application corresponding to transmission of said input packet and monitoring a timer value associated with said application, said timer value corresponding to a maximum time set for completion of routing of the input packet; and
routing and transferring means for determining a transmission destination port on the basis of a destination address stored in a routing table, for routing said input packet to said transmission destination port and for disposing of the input packet or transferring the input packet to a preliminary determined route dependent on the identified application when a time for routing of said input packet exceeds the timer value.

3. A packet transmission routing processing system as set forth in claim 2, wherein said parsing and timer processing means and said routing and transferring processing means comprises:
a packet accumulating portion accumulating said input packet;
a packet parsing portion performing parsing for identifying the application corresponding to the input packet from said packet accumulating portion, generating an application identification number, and reading out of a destination address;
a packet waiting portion for holding the input packet from said packet parsing portion and transmitting the input packet in response to a packet output command;
a packet transferring portion for transferring the packet output from the packet waiting portion to said transmission destination port on the basis of a transmission destination designation and a next process code;
a timer value determining portion outputting said timer value and said next process code corresponding to the application identified by said packet parsing portion;
a monitoring timer portion outputting a time out signal upon termination of measurement of the timer value from said timer value determining portion; and
a routing retrieving portion for performing a routing retrieving processing by outputting said packet output command to the packet waiting portion and outputting a transfer path number and a process code to said packet transferring portion when the routing process based on the destination address is input from said packet parsing portion or said time out signal is input from said monitoring timer portion.

4. A packet transmission routing processing system as set forth in claim 3, wherein a predetermined process is performed upon time-out of said timer value when said routing retrieving process is not completed within a period designated by the timer value; and
said next processing code is a code designating the processing of the input packet when the routing retrieving process in said routing retrieving portion is not completed within the period designated by the timer value.

5. A packet transmission routing process system as set forth in claim 4, wherein said predetermined process of said timer value is to terminate the routing process, and
process of the input packet in the next process code is abandonment of the input packet or transferring the input packet to a predetermined path when the transmission destination cannot be determined.

6. A packet transmission routing process system as set forth in claim 3, wherein, as said monitoring timer portion comprises a counter.

7. A packet transmission routing processing system as set forth in claim 3, wherein said timer value determining portion comprises:
an application judgment portion for generating an address at a value the same as an application identification number from the packet parsing portion or a value derived by multiplying or dividing said application identification number by an integer; and
a random access memory reading out the stored timer value and the next process code for outputting to said monitoring timer and said routing retrieving portion corresponding to the address from said application judgment portion.

8. A packet transmission routing processing system as set forth in claim 3, wherein said timer value determining portion comprises:
a content-addressable memory storing said application identification number, said timer value and said next process code in combination, said content-addressable memory outputs the timer value and the next process code stored therein on the basis of the input application identification number.

9. A packet transmission routing processing system as set forth in claim 7, wherein said random access memory comprises a detachable and rewritable storage element.

10. A packet transmission routing processing system as set forth in claim 7, which further includes input operation and storage processing means for rewriting said timer value in said random access memory.

11. A packet transmission routing processing system as set forth in claim 7, which further includes an external storage data modifying device connected to said random access memory for rewriting the timer value.

12. A packet transmission routing processing system as set forth in claim 7, which further includes an external storage data modifying and communicating device receiving a designation data from a communication network for modifying said timer value of said random access memory.

13. A packet transmission routing processing system as set forth in claim 3, wherein said routing retrieving portion comprises a processing unit including a microprocessor or a digital signal processor executing a sequence for outputting said packet output command to the packet waiting portion, and outputting said transfer path number and the process code to said packet transferring portion when the routing process based on the destination address from the packet parsing portion is completed or after input of the time out signal from said monitoring timer.

14. A packet transmission routing processing system as set forth in claim 3, wherein the application identified by said parsing and timer processing means comprises an internet telephone protocol in a TCP/IP communication network.

15. A packet transmission routing processing system as set forth in claim 2, wherein the timer value is in a range of 10 msec. to 50 msec.

16. A packet transmission routing processing system as set forth in claim 8, wherein said content-addressable memory is a detachable and rewritable storage element.

17. A packet transmission routing processing system as set forth in claim 8, which further includes input operation and storage processing means for rewriting said timer value in said content-addressable memory.

18. A packet transmission routing processing system as set forth in claim 8, which further includes an external storage data modifying device connected to said content-addressable memory for rewriting the timer value.

19. A packet transmission routing processing system as set forth in claim 8, which further includes an external storage data modifying and communicating device receiving a designation data from a communication network for modifying said timer value of said content-addressable memory.

* * * * *